United States Patent [19]
Rector et al.

[11] 3,933,042
[45] Jan. 20, 1976

[54] WATER LEVEL GAUGE

[75] Inventors: Norwood H. Rector; Rodney G. Fredericks, both of Baton Rouge, La.

[73] Assignee: The United States of America as represented by the Secretary of the Navy, Washington, D.C.

[22] Filed: Apr. 5, 1974

[21] Appl. No.: 458,156

[52] U.S. Cl. ............................. 73/304 C; 73/304 R
[51] Int. Cl.² ........................................ G01F 23/26
[58] Field of Search ..... 73/304 C, 304 R; 324/61 P, 324/65 P

[56] References Cited
UNITED STATES PATENTS

| | | | |
|---|---|---|---|
| 2,258,063 | 10/1941 | Meyer | 324/65 P |
| 2,375,084 | 5/1945 | Coroniti et al. | 73/304 C |
| 2,381,875 | 8/1945 | Bryant | 73/304 R |
| 2,485,579 | 10/1949 | Elliott | 73/304 C |
| 2,864,981 | 12/1958 | DeGiers | 73/304 C |
| 2,866,336 | 12/1958 | Hitchcox | 73/304 C |
| 3,042,060 | 7/1962 | Lindemann | 73/65 |

FOREIGN PATENTS OR APPLICATIONS 454,901  6/1968  Switzerland................. 73/304 R

*Primary Examiner*—James J. Gill
*Assistant Examiner*—Anthony V. Ciarlante
*Attorney, Agent, or Firm*—R. S. Sciascia; R. E. O'Neill

[57] ABSTRACT

The invention disclosed in the specification is directed towards an improved device for measuring liquid levels and specifically provides a pair of capacitance probes, one of which is coated with a dielectric material, positioned in a stilling well which is coupled to a conical housing for an entrance orifice to provide controlled level changes; and, in addition is provided with electronic circuitry and recording equipment and power pack.

9 Claims, 8 Drawing Figures

WATER LEVEL GAUGE

The invention described herein may be manufactured and used by or for the Government of the United States of America for governmental purposes without the payment of any royalties thereon or therefor.

The field of oceanography requires that among other things investigators be able to determine liquid levels of oceans, rivers and bays with increasing precision and accuracy, This becomes extremely difficult under actual working conditions since there are a variety of factors controlling instantaneous levels.

For example, wave action, tides, seiche, wind velocity, all play interacting roles in determining an average water level at any given time. Since many studies involve average effects, it is necessary to keep a record of these levels. In some instances, reading every 5, 10 and 15 minutes are sufficient to give the desired information and at other times a continuous record is imperative.

Additionally, since the equipment necessary to make these readings must operate under most weather conditions, ruggedness and durability are required without prohibitive costs. Multiple pieces of equipment may of necessity be required to record an average over an area under certain test conditions which places a further burden of inexpensiveness upon the equipment.

It is therefore an object of this invention to provide an improved liquid level gauge for determining the average level of liquid in a system.

It is yet a further object of this invention to provide an improved water level gauge for determining levels of water in a given body under a variety of real situations.

Another object of this invention is to provide an improved variable capacity water level gauge for measuring the level of rivers, streams, lakes and oceans under varying ambient conditions.

Still a further object of this invention is to provide an improved liquid level gauge including a stilling well, a pipe tower for retaining the stilling well at a fixed position in relationship to the water level to be measured, a capacitance probe inside the stilling well and means for admitting liquid into the stilling well at a predetermined rate and electronic circuitry for placing a signal on the probe.

It is yet a further object of this invention to provide an improved liquid level gauge of the variable capacitance type comprising, a stilling well, means for retaining the stilling well in a predetermined relationship with respect to a liquid whose level is to be measured, a first probe inside of the stilling well, a dielectric coating on the first probe, a second probe in the stilling well spaced from the first probe, means for retaining said first and second probes in a predetermined fixed, spaced relationship to each other, a conical end member coupled to the stilling well for admitting liquid whose level is to be measured into the stilling well, means for applying an electrical signal to the first and second probes and means for measuring the signal between the probes, which is related to the change in capacitance between the first and second probes depended upon the amount of liquid in the stilling well.

Other objects, advantages and novel features of the invention will become apparent from the following detailed description of the invention when considered in conjunction with the accompanying drawings wherein:

FIG. 1, shows the invention in a water environment ready for use.

Figure 1:
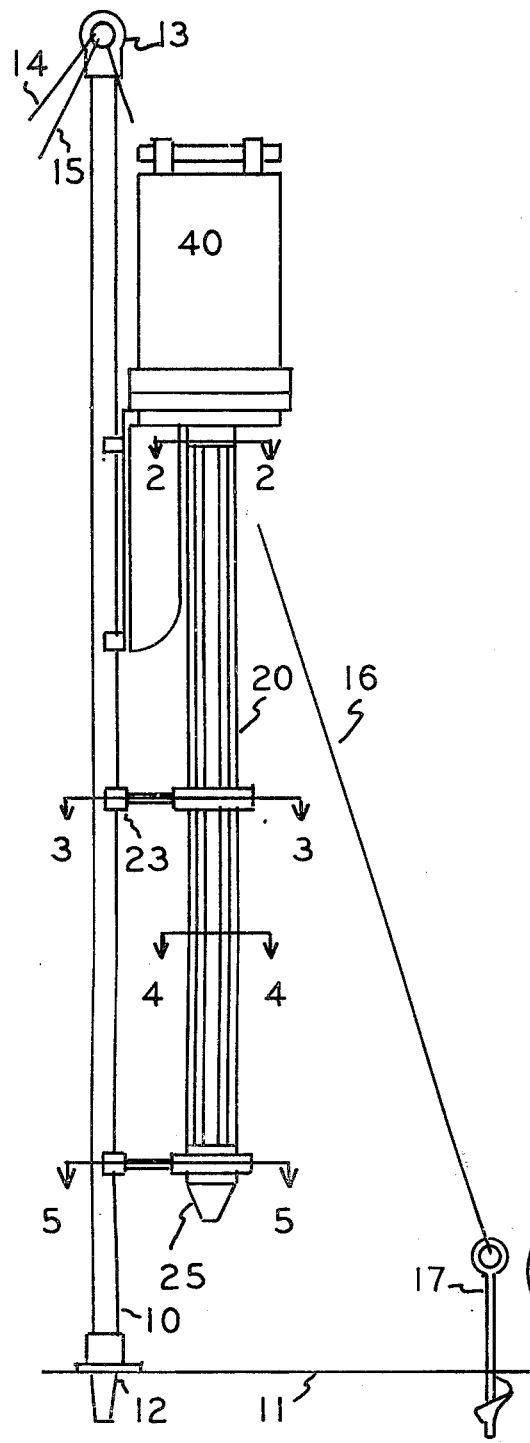
FIG. 1 is a vertical view of the water level gauge shown in place for measuring water levels.
Figure 2:
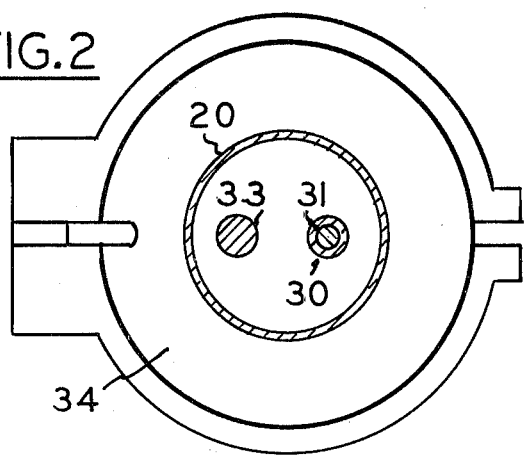
FIG. 2, is a cross sectional view thru lines 2—2 in FIG. 1.
Figure 3:
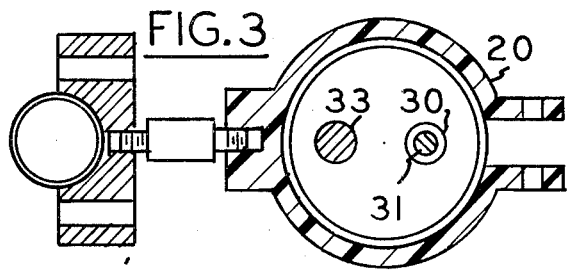
FIG. 3, is a cross sectional view along lines 3—3 in FIG. 1.
Figure 4:
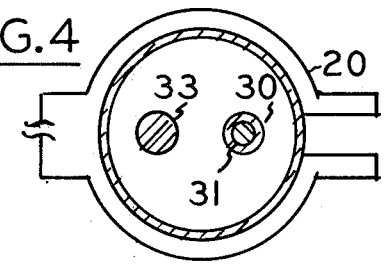
FIG. 4, is a cross sectional view along lines 4—4 in FIG. 1.
Figure 5:
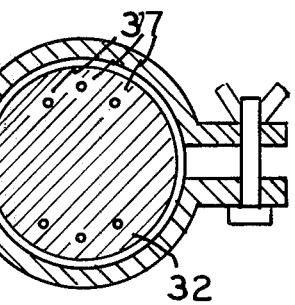
FIG. 5, is a section view along lines 5—5 in FIG. 1.

The invention essentially consists of a pipe tower 10, mounted in the bottom of a stream bed 11, with a peg member 12, actually in the bottom of the stream.

The pipe tower 10 has an eye bolt arrangement 13 and its upper end which provides means for guy wires 14, 15 and 16 are coupled to individual stakes 17 (only one is shown for the sake of convenience) for retaining the liquid level gauge in a vertical position. A stilling well 20 is shown made of a clear plastic material and is selected to have a diameter of such dimensions for incorporation within the liquid, in this case, water to be measured.

The stilling well 20 is shown mounted via clamps 21, 22, and 23 to the pipe tower.

FIGS. 2, 3, 4, and 5 are a series of cross sketched "U's" taken along the stilling well 20 and the pipe tower 10 to show detailed construction of the probes.

Figure 6:
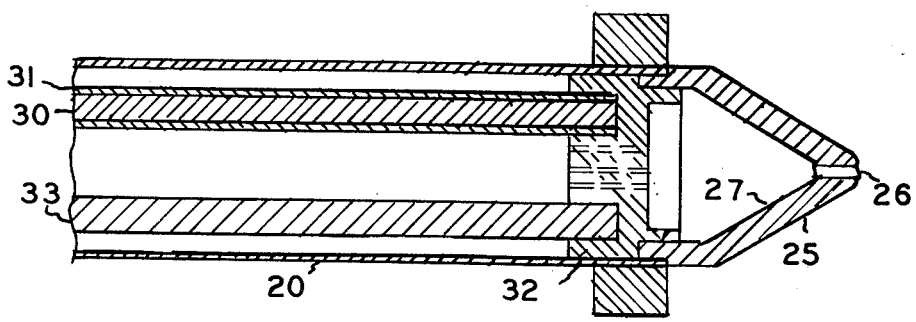
FIG. 6, is a vertical section of the lower portion of the level gauge.

FIG. 6, is a section view along the axis of the stilling well in a plane to include the two probes, shows in addition the details of the end conical member 25. The purpose of the conical member is to allow liquid to enter the stilling well thru an orifice and is conical in shape to prevent any solid matter from settling on the conical interface 27 and thus prevents plugging of the orifice.

The probe member 30 with its outer covering 31, in this case a plexiglass tube, is rigidly retained in position within the stilling well 20 by the lower member 32. The liquid ground member 33 is similarly retained in member 32 rigidly within the stilling well 20. The upper end of the probe 30 and ground 33 are retained rigidly in relationship to the stilling well by member 34. The plexiglass tube 31 extends down into retaining member 32 and seals the lower end of the probe from contact with the liquid. A series of holes 37 in member 32 allows water to rise and fall within the stilling well 20 and the diameter is selected in conjunction with the orifice 26 to adjust the gauge to the type and rate of level change to be measured. That is, it allows the gauge to react to waves with their periodic variations or tides or longer level period fluctuations.

The power pack electronic circuitry are located at the top of the stilling well and shown as a block 40 in FIG. 1. Generally, this includes means for generating the electronic signal in the range of 200 kilohertz to 1 megahertz, means for detecting the signal, a battery pack, a timing device and a recording device. It is generally designed to be removable so that work may be performed on it either on-site or a remote location.

Figure 7:
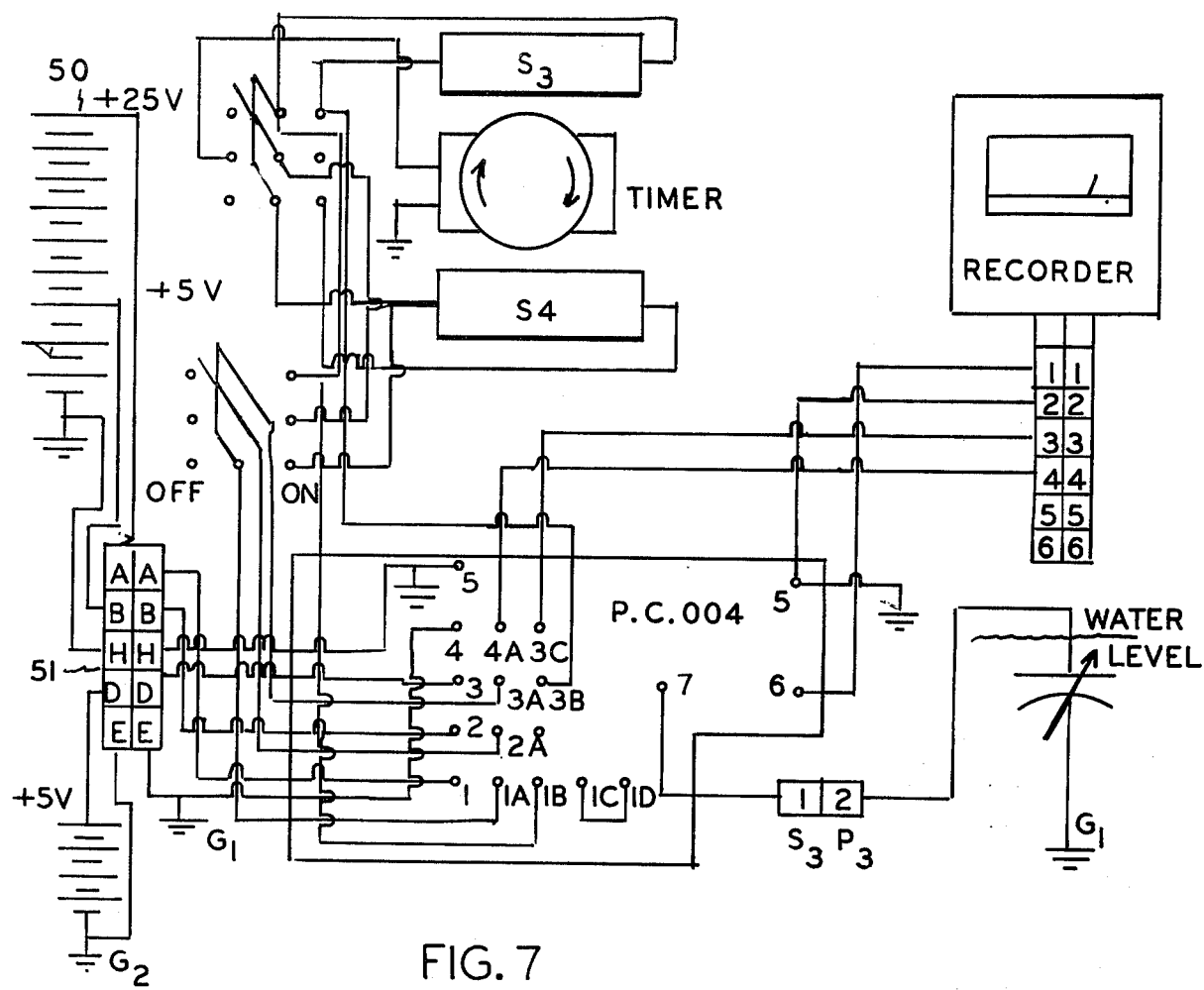
FIG. 7, is a wiring diagram for the level gauge.
Figure 8:
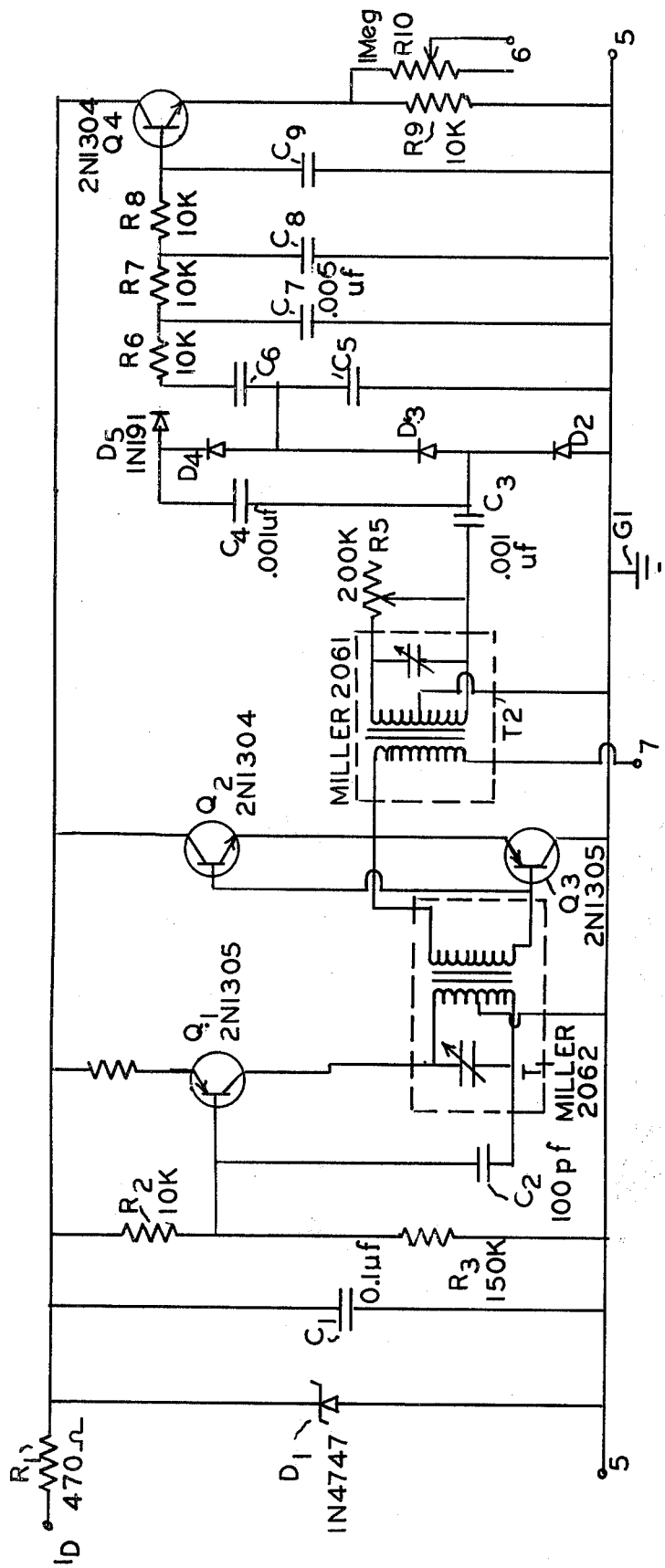
FIG. 8, is a schematic diagram of the successful embodiment of the invention.

FIG. 7 and FIG. 8 show the electronic circuitry and interconnection with the timer and recorder. A power supply 50 consists of a series of batteries and an interconnecting plug 51 which supplies the necessary voltages to the circuitry and other devices. FIG. 8, shows one successful embodiment of the invention wherein there is incorporated the necessary electronic circuitry coupled with printed circuitry techniques to successfully operate the water level gauge. A list of components used therein is set forth in the schematic.

Obviously many modifications and variations of the present invention are possible in the light of the above teachings. It is therefore to be understood that within the scope of the appended claims the invention may be practiced otherwise than as specifically described.

We claim:

1. An improved liquid level gauge of the variable capacitance type comprising:
   a. a stilling well;
   b. means for retaining said stilling well in a predetermined relationship with respect to a liquid whose level is to be measured;
   c. a first probe inside said stilling well;
   d. a dielectric coating on said first probe;
   e. a second probe in said stilling well spaced from said probe;
   f. means for spacing said first and second probes in a predetermined fixed spaced relationship to each other;
   g. a conical end member coupled to said stilling well for admitting liquid whose level is to be measured into said stilling well having a funnel-shape orifice located along the longitudinal axis at the bottom;
   h. means for applying an electrical signal to said first and second probe; and,
   i. means for measuring the signal between said probes which is related to the change in capacitance between said first and second probes depended upon the amount of liquid in said stilling well.

2. The improved liquid level gauge of claim 1 wherein said stilling well is substantially cylindrical in shape and composed of an electrical insulating material.

3. The improved liquid level gauge of claim 2 wherein the retaining means consists of a pipe tower including means for mounting said pipe tower in a fixed relationship to the liquid level to be measured.

4. The improved liquid level gauge of claim 3 wherein said second probe is electrically at ground with respect to the liquid.

5. The improved liquid level gauge of claim 4 wherein said spacing means include a member having passageways therein for admitting liquid into said stilling well.

6. The improved liquid level gauge of claim 5 wherein said conical end member has an orifice therein with a predetermined diameter for controlling the rate of flow of liquid into said stilling well for the purpose of providing the level gauge the capacity of measuring level changes having different periods.

7. The improved liquid level gauge of claim 6 wherein said electrical signal is in the range of 200 kilohertz to 1 megahertz.

8. The improved liquid level gauge of claim 7 wherein said measuring means coupled between said probes is mounted to the top of said stilling well and includes a timing device and a recording device coupled thereto.

9. The improved liquid level gauge of claim 8 wherein said measuring means includes means for transmitting the measured level to a remotely placed recording device.

* * * * *